(12) United States Patent
Rathineswaran et al.

(10) Patent No.: US 10,289,424 B2
(45) Date of Patent: May 14, 2019

(54) SYSTEM AND METHOD FOR LOADING AND POPULATING SYSTEM INVENTORY DATA IN AN EVENT DRIVEN MODEL

(71) Applicant: American Megatrends, Inc., Norcross, GA (US)

(72) Inventors: Chandrasekar Rathineswaran, Cumming, GA (US); Garrett Naegle, Atlanta, GA (US); Ranjodhbir Kaur, Banga (IN)

(73) Assignee: AMERICAN MEGATRENDS, INC., Norcross, GA (US)

( * ) Notice: Subject to any disclaimer, the term of this patent is extended or adjusted under 35 U.S.C. 154(b) by 186 days.

(21) Appl. No.: 15/601,472

(22) Filed: May 22, 2017

(65) Prior Publication Data

US 2018/0336042 A1 Nov. 22, 2018

(51) Int. Cl.
*G06F 9/44* (2018.01)
*G06F 9/4401* (2018.01)
*G06F 8/65* (2018.01)

(52) U.S. Cl.
CPC .............. *G06F 9/4406* (2013.01); *G06F 8/65* (2013.01)

(58) Field of Classification Search
CPC ...................................... G06F 1/32; G06F 9/44
See application file for complete search history.

(56) References Cited

U.S. PATENT DOCUMENTS

| 2004/0268106 A1* | 12/2004 | Holmberg | G06F 8/65 713/1 |
| 2008/0162982 A1* | 7/2008 | Li | G06F 9/4812 714/3 |
| 2013/0138940 A1* | 5/2013 | Wang | G06F 8/654 713/2 |
| 2013/0198504 A1* | 8/2013 | Arnold | G06F 9/44 713/2 |
| 2017/0249349 A1* | 8/2017 | Bhat | G06F 16/2365 |

\* cited by examiner

*Primary Examiner* — Jaweed A Abbaszadeh
*Assistant Examiner* — Keshab R Pandey
(74) *Attorney, Agent, or Firm* — Locke Lord LLP; Tim Tingkang Xia, Esq.

(57) ABSTRACT

Systems and methods for loading and populating system inventory data in an event driven model. A management device, such as a baseboard management controller (BMC), is connected to a host server computing device. The management device has an inventory file storing the system inventory data from a basic input/output system (BIOS) of the host server computing device. When the management device receives the system inventory data from the BIOS of the host server computing device via an in-band channel, the inventory file is updated with the data received. Further, the management device may use existing mechanisms such as the inotify hook function to monitor the inventory file in order to determine whether the inventory file is updated. When the inventory file is updated, the management device invokes a function for loading the inventory file and processing the system inventory data stored in the inventory file.

19 Claims, 3 Drawing Sheets

SYSTEM AND METHOD FOR LOADING AND POPULATING SYSTEM INVENTORY DATA IN AN EVENT DRIVEN MODEL

FIELD

The present disclosure relates generally to controller technology, and more particularly to systems and methods for loading and populating system inventory data in an event driven model.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

In a computing device such as a server, the basic input/output system (BIOS) may perform a "system inventory" program that performing tests to determine the hardware components in the system and collect system inventory data related to the hardware components. In a server system where the BIOS of the server and a baseboard management controller (BMC) have the capabilities to interact, a method of sharing the system inventory data is vital.

Therefore, an unaddressed need exists in the art to address the aforementioned deficiencies and inadequacies.

SUMMARY

Certain aspects of the disclosure direct to a method for loading and populating system inventory data in an event driven model, which includes: providing, at a management device, an inventory file storing the system inventory data from a basic input/output system (BIOS) of a host server computing device; monitoring, by the management device, the inventory file storing the system inventory data in order to determine whether the inventory file is updated; and in response to determining the inventory file to be updated, invoking a function for loading the inventory file and processing the system inventory data stored in the inventory file.

In certain embodiments, the method further includes: receiving, at the management device, the system inventory data from the BIOS of the host server computing device via an in-band channel; and in response to receiving the system inventory data, updating the inventory file with the system inventory data received.

Certain aspects of the disclosure direct to a system, which includes a management device communicatively connected to a host server computing device. The management device includes a processor and a storage device storing computer executable code and an inventory file storing system inventory data from a BIOS of the host server computing device. The computer executable code, when executed at the processor, is configured to: receive the system inventory data from the BIOS of the host server computing device via an in-band channel; update the inventory file with the system inventory data received; monitor the inventory file storing the system inventory data in order to determine whether the inventory file is updated; and in response to determining the inventory file to be updated, invoke a function for loading the inventory file and processing the system inventory data stored in the inventory file.

Certain aspects of the disclosure direct to a non-transitory computer readable medium storing computer executable code and an inventory file storing system inventory data from a BIOS of a host server computing device. The computer executable code, when executed at the processor, is configured to: receive the system inventory data from the BIOS of the host server computing device via an in-band channel; update the inventory file with the system inventory data received; monitor the inventory file storing the system inventory data in order to determine whether the inventory file is updated; and in response to determining the inventory file to be updated, invoke a function for loading the inventory file and processing the system inventory data stored in the inventory file.

In certain embodiments, the management device is a baseboard management controller (BMC).

In certain embodiments, the in-band channel is an Intelligent Platform Management Interface (IPMI) over universal serial bus (USB) channel. In certain embodiments, the in-band channel is an IPMI over keyboard controller style (KCS) channel.

In certain embodiments, the inventory file storing the system inventory data is monitored using an inotify hook function by mapping the inventory file in a watch list of the inotify hook function. In certain embodiments, the inotify hook function is configured to monitor the inventory file by: determining whether a writing process is performed to the inventory file for writing the system inventory data received; in response to determining the writing process being performed, monitoring the writing process; and in response to the writing process being complete, generating a close-write event for invoking the function for loading the inventory file and processing the system inventory data stored in the inventory file.

In certain embodiments, the function for loading the inventory file and processing the system inventory data stored in the inventory file is a Representational State Transfer (REST) function, such as a Redfish® function.

These and other aspects of the present disclosure will become apparent from the following description of the preferred embodiment taken in conjunction with the following drawings and their captions, although variations and modifications therein may be affected without departing from the spirit and scope of the novel concepts of the disclosure.

BRIEF DESCRIPTION OF THE DRAWINGS

The present disclosure will become more fully understood from the detailed description and the accompanying drawings, wherein.

DETAILED DESCRIPTION

The present disclosure is more particularly described in the following examples that are intended as illustrative only since numerous modifications and variations therein will be apparent to those skilled in the art. Various embodiments of the disclosure are now described in detail. Referring to the drawings, like numbers, if any, indicate like components throughout the views. As used in the description herein and throughout the claims that follow, the meaning of "a", "an", and "the" includes plural reference unless the context clearly dictates otherwise. Also, as used in the description herein and throughout the claims that follow, the meaning of "in" includes "in" and "on" unless the context clearly dictates otherwise. Moreover, titles or subtitles may be used in the specification for the convenience of a reader, which shall have no influence on the scope of the present disclosure. Additionally, some terms used in this specification are more specifically defined below.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way. Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and in no way limits the scope and meaning of the disclosure or of any exemplified term. Likewise, the disclosure is not limited to various embodiments given in this specification.

Unless otherwise defined, all technical and scientific terms used herein have the same meaning as commonly understood by one of ordinary skill in the art to which this disclosure pertains. In the case of conflict, the present document, including definitions will control.

As used herein, "around", "about" or "approximately" shall generally mean within 20 percent, preferably within 10 percent, and more preferably within 5 percent of a given value or range. Numerical quantities given herein are approximate, meaning that the term "around", "about" or "approximately" can be inferred if not expressly stated.

As used herein, "plurality" means two or more.

As used herein, the terms "comprising," "including," "carrying," "having," "containing," "involving," and the like are to be understood to be open-ended, i.e., to mean including but not limited to.

As used herein, the phrase at least one of A, B, and C should be construed to mean a logical (A or B or C), using a non-exclusive logical OR. It should be understood that one or more steps within a method may be executed in different order (or concurrently) without altering the principles of the present disclosure.

As used herein, the term "module" may refer to, be part of, or include an Application Specific Integrated Circuit (ASIC); an electronic circuit; a combinational logic circuit; a field programmable gate array (FPGA); a processor (shared, dedicated, or group) that executes code; other suitable hardware components that provide the described functionality; or a combination of some or all of the above, such as in a system-on-chip. The term module may include memory (shared, dedicated, or group) that stores code executed by the processor.

The term "code", as used herein, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The term "interface", as used herein, generally refers to a communication tool or means at a point of interaction between components for performing data communication between the components. Generally, an interface may be applicable at the level of both hardware and software, and may be uni-directional or bi-directional interface. Examples of physical hardware interface may include electrical connectors, buses, ports, cables, terminals, and other I/O devices or components. The components in communication with the interface may be, for example, multiple components or peripheral devices of a computer system.

The terms "chip" or "computer chip", as used herein, generally refer to a hardware electronic component, and may refer to or include a small electronic circuit unit, also known as an integrated circuit (IC), or a combination of electronic circuits or ICs.

Certain embodiments of the present disclosure relate to computer technology. As depicted in the drawings, computer components may include physical hardware components, which are shown as solid line blocks, and virtual software components, which are shown as dashed line blocks. One of ordinary skill in the art would appreciate that, unless otherwise indicated, these computer components may be implemented in, but not limited to, the forms of software, firmware or hardware components, or a combination thereof.

The apparatuses, systems and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

Certain aspects of the present disclosure direct to systems and methods for loading and populating system inventory data in an event driven model. In particular, in a server system where the BIOS of the server and a BMC have the capabilities to interact, a method of sharing the system inventory data is vital. In some cases, the most efficient way of sharing the system inventory data is to use an event driven model, where a notification mechanism is used to invoke the parser function. Thus, certain aspects of the present disclosure relate to a means for loading and populating system inventory data in an event driven model, which defines the notification mechanism and a method thereof to hook the notification to parse the system inventory data and populate it. In certain embodiments, when the BIOS of the server system transfers the system inventory data to the BMC using an in-band channel, a BMC agent can receive the details of the system inventory data and store the data received in a Linux file. A LUA function can be mapped to the inotify hook on the Linux file in order to be triggered when there is a change in the file. Every time the file gets updated, the LUA function to parse the system inventory data will be triggered.

Figure 1:
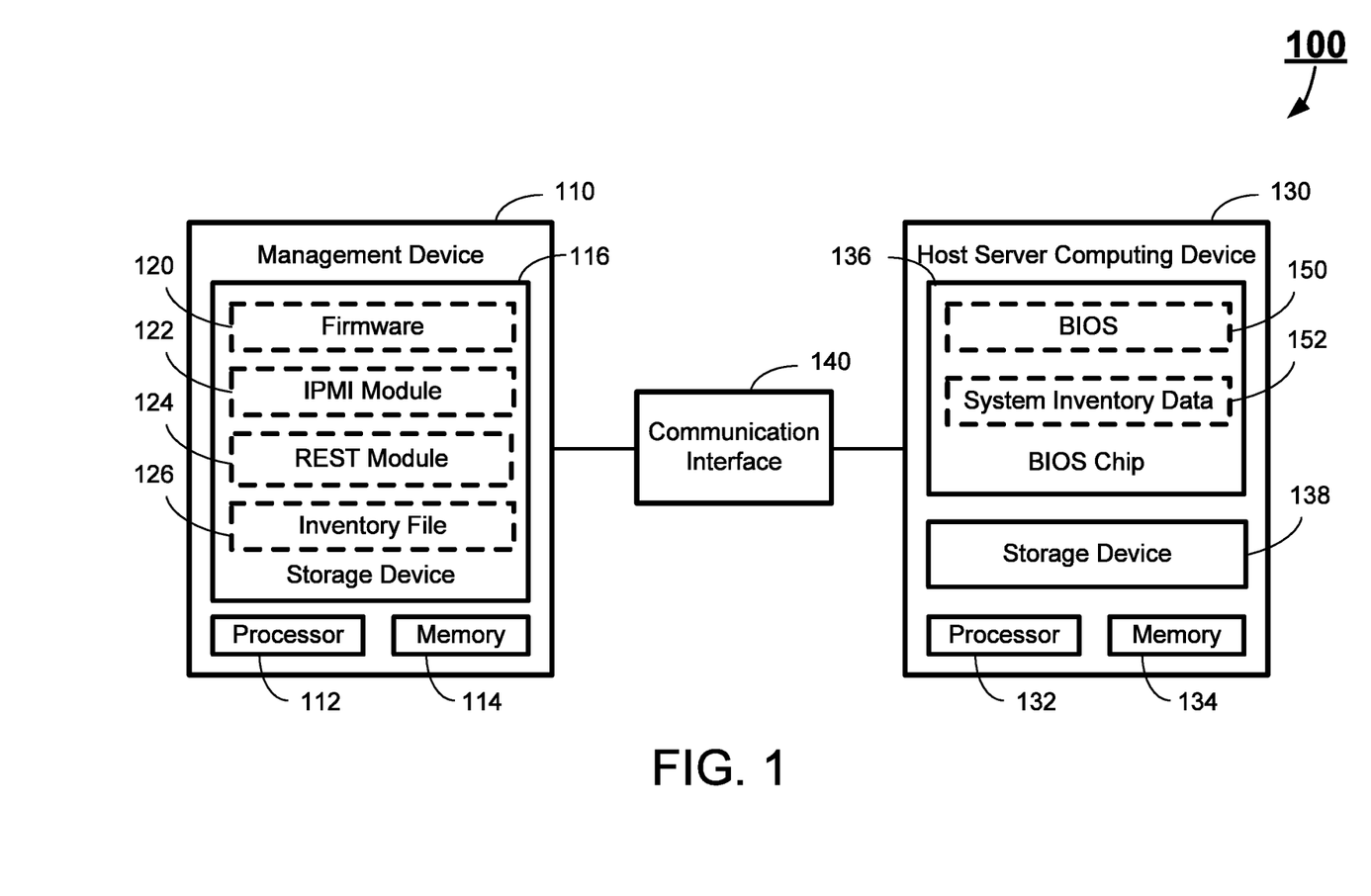
FIG. 1 schematically depicts an exemplary system according to certain embodiments of the present disclosure.

FIG. 1 schematically depicts an exemplary system according to certain embodiments of the present disclosure. As shown in FIG. 1, the system 100 includes a management device 110, which is communicatively connected to a host server computing device 130 via a communication interface 140, which provides an in-band channel between the host server computing device 130 and the management device 110. In certain embodiments, the communication interface 140 may be a system interface, such as a keyboard controller style (KCS) interface, or may be a universal serial bus (USB) interface.

The management device 110 is a specialized microcontroller configured to provide the service to the users. In certain embodiments, the management device 110 may be a BMC used for baseboard management purposes. Alternatively, the management device 110 may be a management controller for other purposes, such as chassis management, rack management, virtual machine management, backplane or enclosure management, or other type of purposes.

The host server computing device 130 is a computing device configured to function as a server and managed by the management device 110. In certain embodiments, the host server computing device 130 may be a general purpose computer or a specific purpose computer. In certain embodiments, when the management device 110 is a BMC, the host server computing device 130 may include a baseboard or the "motherboard" (not shown), which is a printed circuit board to which a multitude of components or devices may be connected by way of a system bus or other electrical communication paths, and the BMC 110 may be a component on the baseboard.

In certain embodiments, the management device 110 may support the Intelligent Platform Management Interface (IPMI) standard. IPMI is an industry standard and is described in, e.g., "IPMI: Intelligent Platform Management Interface Specification, Second Generation, v.2.0, Feb. 12, 2004," which is incorporated herein by reference in its entirety. IPMI defines a protocol, requirements and guidelines for implementing a management solution for server-class computer systems. The features provided by the IPMI standard include power management, system event logging, environmental health monitoring using various sensors, watchdog timers, field replaceable unit information, in-band and out-of-band access to the management controller, simple network management protocol (SNMP) traps, etc. For example, the host server computing device 130 may communicate with the management device 110 via the in-band channel of the communication interface 140 using the IPMI protocol. In certain embodiments, based on the type of the communication interface 140, the communication may be IPMI over KCS or IPMI over USB, or any other IPMI based in-band communication. In other words, the communication interface 140 must be an interface that allows IPMI communication.

As shown in FIG. 1, the management device 110 includes a processor 112, a memory 114, and a storage device 116. Similarly, the host server computing device 130 may include a processor 132, a memory 134, a storage device 136, and a BIOS chip 138 storing a BIOS 150 and the system inventory data 152. Further, the management device 110 and the host server computing device 130 may respectively include other hardware components and software components (not shown) to perform its corresponding tasks. For example, the management device 110 may include a network interface, such as a network interface card (NIC), which is used to connect the management device 110 to an out-of-band network (not shown). Correspondingly, the host server computing device 130 may also include a network interface such as a NIC, thus enabling the management device 110 to perform out-of-band communication in addition to the in-band communication via the communication interface 140. Other examples of the hardware and software components of the management device 110 and/or the host server computing device 130 may include, but not limited to, other required memory, interfaces, buses, Input/Output (I/O) modules and peripheral devices.

The processor 112 is the processing core of the management device 110, configured to control operation of the management device 110. In certain embodiments, the processor 112 may execute any computer executable code or instructions, such as the firmware 120, the IPMI module 122, the Representational State Transfer (REST) module 124 and an inventory file 126, or other applications and instructions of the management device 110. In certain embodiments, the management device 110 may run on more than one processor, such as two processors, four processors, eight processors, or any suitable number of processors.

The memory 114 can be a volatile memory, such as the random-access memory (RAM), for storing the data and information during the operation of the management device 110. In certain embodiments, the memory 114 may be a volatile memory array. In certain embodiments, the management device 110 may run on more than one memory 114.

The storage device 116 is a non-volatile data storage media for storing computer executable code or instructions for performing the operation of the management device 110. In certain embodiments, the computer executable code or instructions of the management device 110 may be implemented as one or more application programs or modules. Examples of the storage device 116 may include non-volatile memory such as flash memory, non-volatile random-access memory (NVRAM), memory cards, USB drives, hard drives, floppy disks, optical drives, or any other types of data storage devices. In certain embodiments, the management device 110 may have multiple storage devices 116, which may be identical storage devices or different types of storage devices, and the firmware 120, the IPMI module 122, the REST module 124 and the inventory file 126, and other applications or data of the management device 110 may be stored in one or more of the storage devices 116 of the management device 110.

The BIOS chip 138 is one of the most crucial components in the host server computing device 130 or any computer system. In certain embodiments, the BIOS chip 138 is a non-volatile memory, such as a flash memory chip, an electrically erasable programmable read-only memory (EEPROM) chip or a complementary metal oxide semiconductor (CMOS) memory. As shown in FIG. 1, the BIOS chip 138 stores the BIOS code 150 (hereinafter the BIOS 150), and the system inventory data 152. In certain embodiments, the BIOS 170 includes multiple modules, such as the BIOS startup code and applications that may be used to collect information from the hardware components of the host server computing device 130 to form the system inventory data 152. It should be noted that the process for the BIOS 170 to collect the system inventory data 152 from the hardware components of the host server computing device 130 may vary, and is not intended to limit the disclosure.

As shown in FIG. 1, the applications and data stored in the storage device 116 of the management device 110 include the firmware 120, the IPMI module 122, the REST module 124 and the inventory file 126. As discussed above, each of the firmware 120, the IPMI module 122, the REST module 124 and the inventory file 126 may be formed by the computer executable code or instructions executable at the processor 112. In certain embodiments, each of the firmware 120, the IPMI module 122 and the REST module 124 may further include sub-modules. Alternatively, in certain embodiments, some or all of the firmware 120, the IPMI module 122 and the REST module 124 may be combined to form a single module. In certain embodiments, the storage device 116 may store other applications independent from the firmware 120, the IPMI module 122, the REST module 124 and the inventory file 126. For example, the storage device 116 may store software modules that provide a plurality of services, such as the web server service, the media redirection service, or any other types of services.

The firmware 120 stored in the storage device 116 includes the computer executable code that may be executed at the processor 112 to enable the operations of the management device 110. In certain embodiments, the firmware 120 may include one or more modules or software components that may be executed independently. In certain embodiments, the IPMI module 122 and the REST module 124 may be a part of the firmware 120, and the inventory file 126 may be stored in a file system provided by the firmware 120. For example, the firmware 120 may provide a Linux file system, and the inventory file 126 may be a Linux file. In certain embodiments, each of the IPMI module 122 and the REST module 124 may respectively be a separate software module independent from the firmware 120.

The IPMI module 122 is a software application configured to provide IPMI services for the management device 110. Specifically, when the BIOS 150 of the host server computing device 130 sends the system inventory data 152 to the management device 110 via the in-band channel of the communication interface 140 (such as the IPMI over KCS or IPMI over USB), the IPMI module 122 may receive the system inventory data and update in the inventory file 126 using the data received. However, since there is no definition under the IPMI protocol as to how the system inventory data can be processed or parsed, the IPMI module 122 is not in charge of the parsing process of the system inventory data stored in the inventory file 126. In other words, the only function the IPMI module 122 provides in relation to the inventory file 126 is to store the system inventory data received from the BIOS 150 of the host server computing device 130 in the inventory file 126.

The REST module 124 is a software application configured to provide REST services for the management device 110. REST (also referred to as RESTful) services provide interoperablility between computer systems on the Internet. Specifically, the REST module 124 may provide a REST-based application interface (API), e.g., a firmware manageability API, that may be used to access to the configurable computing resources at the host server computing device 130. For example, the REST services may include a RED-FISH® service. REDFISH® is an open industry standard specification and schema that specifies a RESTful interface and utilizes JavaScript Object Notation (JSON) and OData for the management of scale-out computing servers and for accessing data defined in model format to perform out-of-band systems management. The REST services may support some or all of the requirements of "Redfish Scalable Platforms Management API Specification, Version: 1.0.0, Document Identifier: DSP0266, Date: 2015 Aug. 4," which is incorporated herein in its entirety by reference. In certain embodiments, the REST services provided by the REST module 124 may include a function for loading the inventory file 126 and processing the system inventory data stored in the inventory file 126.

The inventory file 126 is a file under the file system (e.g., Linux) that stores the system inventory data provided by the BIOS 150 of the host server computing device 130.

As discussed above, when the BIOS 150 of the host server computing device 130 sends the system inventory data 152 to the management device 110 via the in-band channel of the communication interface 140 (such as the IPMI over KCS or IPMI over USB), the IPMI module 122 may receive the system inventory data and update in the inventory file 126 using the data received. Further, when the function provided by the REST module 124 is invoked, the function may perform loading the inventory file 126 and processing the system inventory data stored in the inventory file 126. However, there is no existing mechanism provided by the IPMI module 122 or the REST module 124 to indicate whether the system inventory data stored in the inventory file 126 is updated. For example, when the system inventory data is transmitted from the BIOS of the server to the BMC, there is no existing mechanism to determine whether the transmission of the system inventory data being transmitted is complete, or the updating process of the inventory file 126 is performed. Thus, a mechanism to indicate the update of the inventory file 126 is necessary such that the function provided by the REST module 124 for loading the inventory file 126 and processing the system inventory data stored in the inventory file 126 may be invoked at the appropriate timing.

In certain embodiments, the inotify hook function provided by the Linux kernel of the firmware 120 may be used to provide the mechanism that indicates the update of the inventory file 126. The inotify API provides a mechanism for monitoring filesystem events, which can be used to monitor individual files or directories. Specifically, inotify may be used to determine the status of one or more Linux files, and generate corresponding inotify events. For example, an IN_MODIFY event indicates the file was modified, and an IN_CLOSE_WRITE event indicates that a file opened for writing was closed. Thus, the inventory file 126 may be added to the Linux files being monitored by mapping the inventory file 126 in a watch list of the inotify hook function, and the inotify events may be used as the trigger for the function provided by the REST module 124 for loading the inventory file 126 and processing the system inventory data stored in the inventory file 126.

Figure 2:
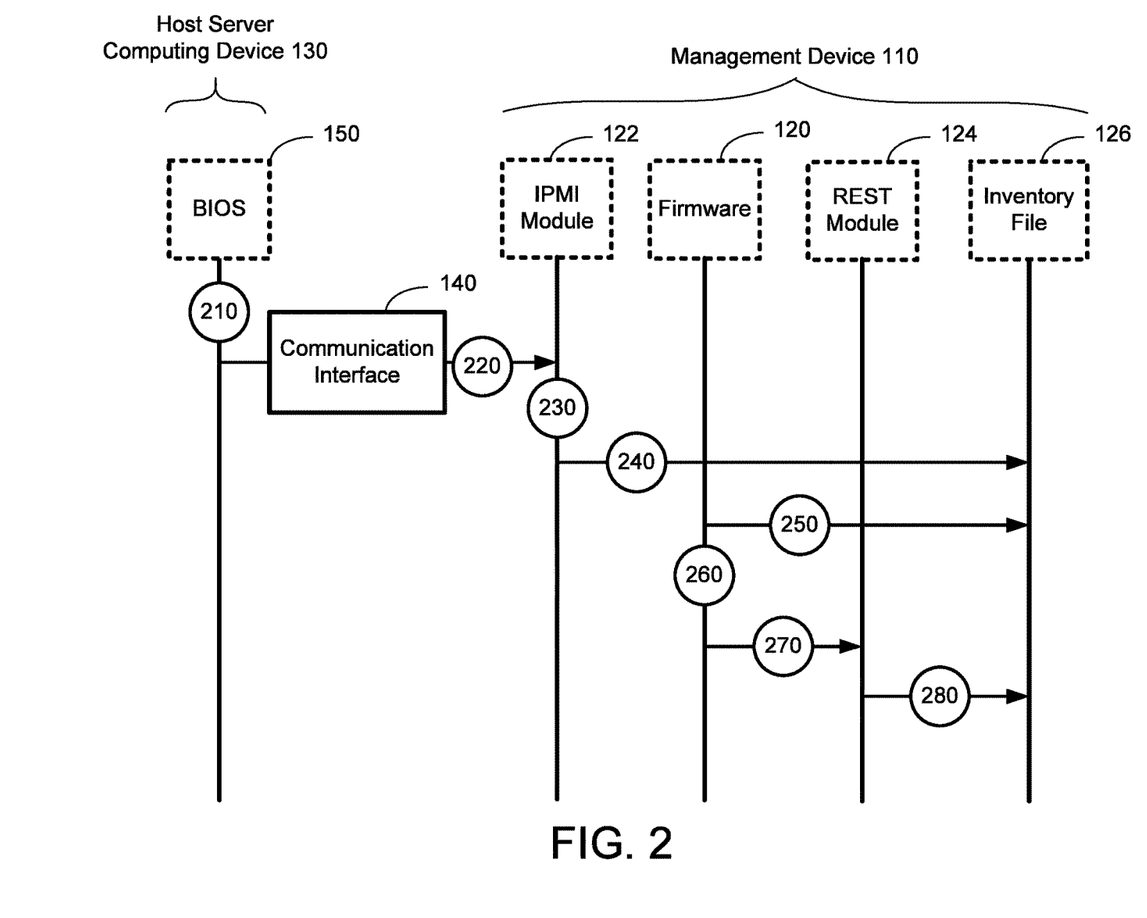
FIG. 2 depicts a process for loading and populating system inventory data in an event driven model according to certain embodiments of the present disclosure.

FIG. 2 depicts a process for loading and populating system inventory data in an event driven model according to certain embodiments of the present disclosure. In certain embodiments, the process or method as shown in FIG. 2 may be implemented by a system as shown in FIG. 1 for performing loading and populating system inventory data in an event driven model at the management device 110. It should be particularly noted that, unless otherwise stated in the present disclosure, the steps of the method or process may be arranged in a different sequential order, and are thus not limited to the sequential order as shown in FIG. 2.

As shown in FIG. 2, at the host server computing device 130, at procedure 210, the BIOS 150 collects information from the hardware components of the host server computing device 130 to form the system inventory data 152. At procedure 220, the BIOS 150 sends the system inventory data 152 to the management device 110 via the in-band channel formed by the communication interface 140. For example, when the communication interface 140 is the KCS interface, the in-band channel may be an IPMI over KCS channel. Alternatively, when the communication interface 140 is the USB interface, the in-band channel may be an IPMI over USB channel. It should be noted that the only requirement for the process of transmitting the system inventory data 152 from the BIOS 150 to the management device 110 via the in-band channel is under the IPMI protocol. For example, the system inventory data 152 may be included in an IPMI message and sent to the management device 110 via the in-band channel. Details of the transmission of the system inventory data 152 is therefore not elaborated, and not intended to limit the disclosure.

At procedure 230, upon receiving the IPMI message that includes the system inventory data from the BIOS 150 of the host server computing device 130, the IPMI module 122 processes the IPMI message to retrieve the system inventory data, and at procedure 240, the IPMI module 122 stores the system inventory data received in the inventory file 126 to update the inventory file 126. It should be noted that the IPMI standard does not define how the inventory file 126 is monitored or how the system inventory data stored in the inventory file 126 is parsed. In other words, the IPMI module 122 is not involved in any of the further process for loading and processing the system inventory data stored in the inventory file 126.

At procedure 250, the inotify hook function provided by the Linux kernel of the firmware 120 may be used to monitor the status of the inventory file 126. Specifically, the inotify hook function may be configured by mapping the inventory file 126 (which is a Linux file) in a watch list of the inotify hook function. In this case, the inotify hook function may be used to monitor the status of the inventory file 126. For example, when the IPMI module 122 is updating the inventory file 126 with the system inventory data received at the procedure 240, the inotify hook function may generate an IN_MODIFY event to indicate the file was modified. At procedure 260, once the IPMI module 122 finishes updating the inventory file 126, the inotify hook function may generate an IN_CLOSE_WRITE event to indicate that the inventory file 126 was closed (i.e., the writing process performed to the inventory file 126 is complete). Upon generating the IN_CLOSE_WRITE event, at procedure 270, the IN_CLOSE_WRITE event invokes the function provided by the REST module 124, and at procedure 280, the function provided by the REST module 124 performs loading the inventory file 126 and processing the system inventory data stored in the inventory file 126.

Figure 3:
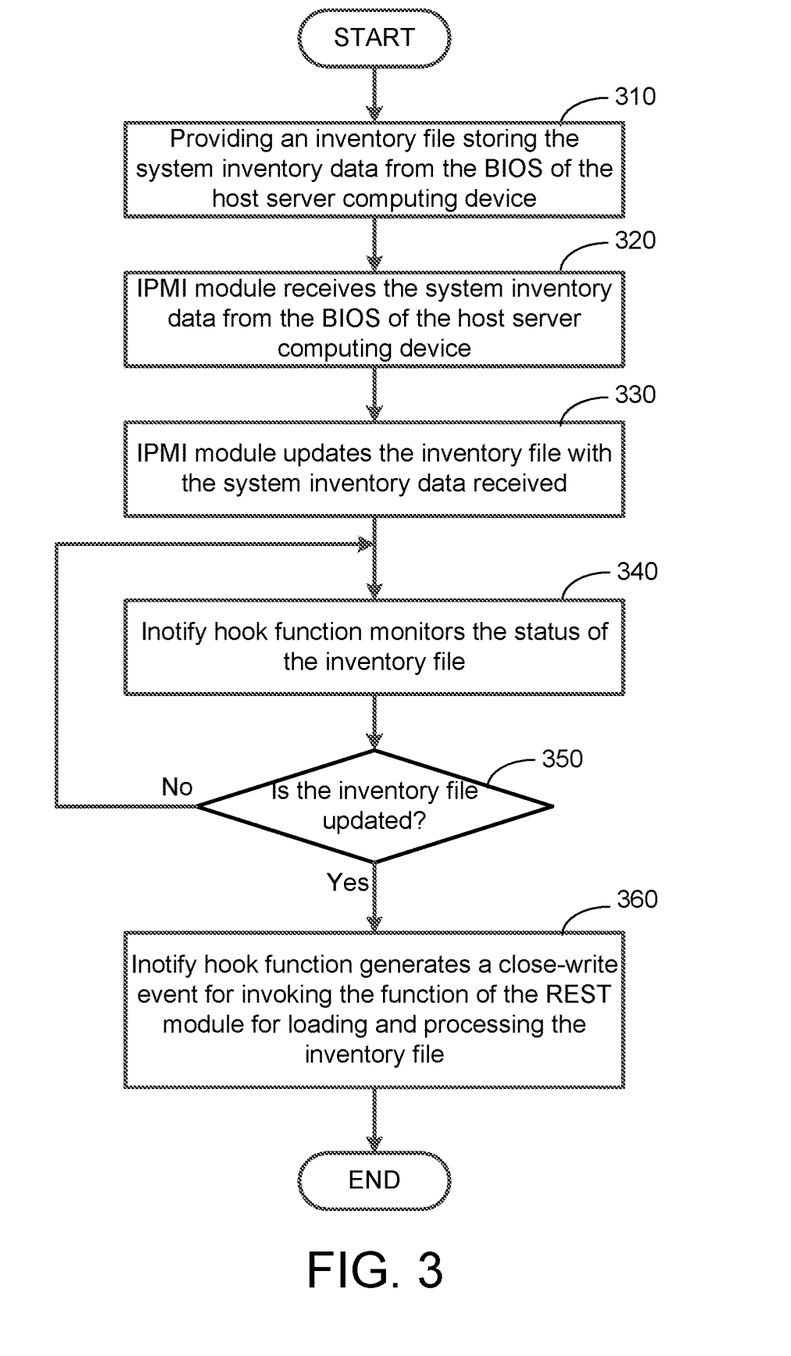
FIG. 3 depicts a flowchart of loading and populating system inventory data in an event driven model according to certain embodiments of the present disclosure.

FIG. 3 depicts a flowchart of loading and populating system inventory data in an event driven model according to certain embodiments of the present disclosure. In certain embodiments, the method as shown in FIG. 3 may be implemented by a system as shown in FIG. 1 for loading and populating system inventory data in an event driven model. In certain embodiments, the method may be implemented by the management device 110 of the system 100 as shown in FIG. 1. It should be particularly noted that, unless otherwise stated in the present disclosure, the steps of the method may be arranged in a different sequential order, and are thus not limited to the sequential order as shown in FIG. 3.

As shown in FIG. 3, at procedure 310, the management device 110 provides an inventory file 126 storing the system inventory data from the BIOS 150 of the host server computing device 130. At procedure 320, the IPMI module 122 may receive the system inventory data from the BIOS 150 of the host server computing device 130 via an in-band channel. In certain embodiments, the in-band channel may be an IPMI over KCS channel or an IPMI over USB channel, based on the type of the communication interface 140 between the management device 110 and the host server computing device 130. Upon receiving the system inventory data, at procedure 330, the IPMI module 122 updates the inventory file 126 with the system inventory data received.

Meanwhile, at procedure 340, the inotify hook function provided by the firmware 120 of the management device 110 performs the monitoring process for the status of the inventory file 126. Specifically, the inotify hook function may perform the monitoring process by mapping the inventory file 126 in a watch list of the inotify hook function. At procedure 350, the inotify hook function may determine whether the inventory file 126 is updated. In certain embodiments, the determination may be performed based on whether a writing process is performed to the inventory file 126 for writing the system inventory data received at the procedure 330. If the inventory file is not updated, no action is performed. On the other hand, if a writing process is performed to the inventory file 126, the inotify hook function keeps monitoring the writing process, until the writing process is complete. When the inotify hook function determines the writing process to be complete, at procedure 360, the inotify hook function generates a close-write event for invoking the function of the REST module 124 for loading the inventory file 126 and processing the system inventory data stored in the inventory file 126.

As discussed above, the system and method adopts an event driven model, which enables the management device 110 to monitor the update of the inventory file 126 using the inotify hook function. Every time the inventory file 126 is updated with the system inventory data received from the BIOS 150 of the host server computing device 130, the REST function provided by the REST module 124 may be invoked to parse the system inventory data stored in the inventory file 126. Since the inotify hook function is an independent process from the IPMI module 122 or the REST module 124, the invocation of the function provided by the REST module 124 for loading the inventory file 126 and processing the system inventory data stored in the inventory file 126 may be performed at the appropriate timing.

In a further aspect, the present disclosure is related to a non-transitory computer readable medium storing computer executable code. The code, when executed at the processor of the management device 110, may perform the method as described above. In certain embodiments, the non-transitory computer readable medium may include, but not limited to, any physical or virtual storage media for the management device 110. In certain embodiments, the non-transitory computer readable medium may be implemented as the storage device 116 of the management device 110 as shown in FIG. 1.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope. Accordingly, the scope of the present disclosure is defined by the appended claims rather than the foregoing description and the exemplary embodiments described therein.

What is claimed is:

1. A method for loading and populating system inventory data in an event driven model, comprising:
providing, at a management device, an inventory file storing the system inventory data from a basic input/output system (BIOS) of a host server computing device;
monitoring, by the management device, the inventory file storing the system inventory data using an inotify hook function by mapping the inventory file in a watch list of the inotify hook function in order to determine whether the inventory file is updated; and
in response to determining the inventory file is updated, invoking a function for loading the inventory file and processing the system inventory data stored in the inventory file.

2. The method of claim 1, wherein the management device is a baseboard management controller (BMC).

3. The method of claim 1, further comprising:
receiving, at the management device, the system inventory data from the BIOS of the host server computing device via an in-band channel; and
in response to receiving the system inventory data, updating the inventory file with the system inventory data received.

4. The method of claim 3, wherein the in-band channel is an Intelligent Platform Management Interface (IPMI) over universal serial bus (USB) channel.

5. The method of claim 3, wherein the in-band channel is an Intelligent Platform Management Interface (IPMI) over keyboard controller style (KCS) channel.

6. The method of claim 1, wherein the inotify hook function is configured to monitor the inventory file by:
determining whether a writing process is performed to the inventory file for writing the system inventory data received;
in response to determining the writing process being performed, monitoring the writing process; and
in response to the writing process being complete, generating a close-write event for invoking the function for loading the inventory file and processing the system inventory data stored in the inventory file.

7. The method of claim 1, wherein the function for loading the inventory file and processing the system inventory data stored in the inventory file is a Representational State Transfer (REST) function.

8. A system, comprising:
a management device communicatively connected to a host server computing device, the management device comprising a processor and a storage device storing computer executable code and an inventory file storing system inventory data from a basic input/output system (BIOS) of the host server computing device, wherein the computer executable code comprises an inotify hook function for monitoring the inventory file storing the system inventory data, wherein the inventory file is mapped in a watch list of the inotify hook function;
wherein the computer executable code, when executed at the processor, is configured to:
receive the system inventory data from the BIOS of the host server computing device via an in-band channel;
update the inventory file with the system inventory data received;
monitor the inventory file storing the system inventory data using the inotify hook function by mapping the inventory file in the watch list of the inotify hook function in order to determine whether the inventory file is updated; and
in response to determining the inventory file is updated, invoke a function for loading the inventory file and processing the system inventory data stored in the inventory file.

9. The system of claim 8, wherein the management device is a baseboard management controller (BMC).

10. The system of claim 8, wherein the in-band channel is an Intelligent Platform Management Interface (IPMI) over universal serial bus (USB) channel.

11. The system of claim 8, wherein the in-band channel is an Intelligent Platform Management Interface (IPMI) over keyboard controller style (KCS) channel.

12. The system of claim 8, wherein the inotify hook function is configured to monitor the inventory file by:
determining whether a writing process is performed to the inventory file for writing the system inventory data received;
in response to determining the writing process being performed, monitoring the writing process; and
in response to the writing process being complete, generating a close-write event for invoking the function for loading the inventory file and processing the system inventory data stored in the inventory file.

13. The system of claim 8, wherein the function for loading the inventory file and processing the system inventory data stored in the inventory file is a Representational State Transfer (REST) function.

14. A non-transitory computer readable medium storing computer executable code and an inventory file storing system inventory data from a basic input/output system (BIOS) of a host server computing device, wherein the computer executable code comprises an inotify hook function for monitoring the inventory file storing the system inventory data, and the inventory file is mapped in a watch list of the inotify hook function, and wherein the computer executable code, when executed at a processor of a management device, is configured to:
receive the system inventory data from the BIOS of the host server computing device via an in-band channel;
update the inventory file with the system inventory data received;
monitor the inventory file storing the system inventory data using the inotify hook function by mapping the inventory file in the watch list of the inotify hook function in order to determine whether the inventory file is updated; and
in response to determining the inventory file is updated, invoke a function for loading the inventory file and processing the system inventory data stored in the inventory file.

15. The non-transitory computer readable medium of claim 14, wherein the management device is a baseboard management controller (BMC).

16. The non-transitory computer readable medium of claim 14, wherein the in-band channel is an Intelligent Platform Management Interface (IPMI) over universal serial bus (USB) channel.

17. The non-transitory computer readable medium of claim 14, wherein the in-band channel is an Intelligent Platform Management Interface (IPMI) over keyboard controller style (KCS) channel.

18. The non-transitory computer readable medium of claim 14, wherein the inotify hook function is configured to monitor the inventory file by:

determining whether a writing process is performed to the inventory file for writing the system inventory data received;

in response to determining the writing process being performed, monitoring the writing process; and in response to the writing process being complete, generating a close-write event for invoking the function for loading the inventory file and processing the system inventory data stored in the inventory file.

19. The non-transitory computer readable medium of claim 14, wherein the function for loading the inventory file and processing the system inventory data stored in the inventory file is a Representational State Transfer (REST) function.

* * * * *